United States Patent [19]
Allerton, III et al.

[11] Patent Number: 5,294,244
[45] Date of Patent: Mar. 15, 1994

[54] THERMAL RECLAMATION METHOD FOR THE RECOVERY OF METALS FROM AIR BAG INFLATORS

[75] Inventors: Hugh G. Allerton, III, Rochester Hills; James L. Coburn, Houghton; Bernie M. Thames, New Baltimore; Dennis S. Bal, Tshpeming, all of Mich.

[73] Assignee: TRW Vehicle Safety Systems Inc., Lyndhurst, Ohio

[21] Appl. No.: 97,661

[22] Filed: Jul. 27, 1993

[51] Int. Cl.$^5$ ............................................. C21B 13/14
[52] U.S. Cl. ........................................ 75/401; 75/403; 75/581; 75/687
[58] Field of Search ................... 75/401, 405, 581, 687

[56] References Cited
U.S. PATENT DOCUMENTS 3,556,500  1/1971  Fritz et al. .
3,615,357  10/1971  Walmer .
3,762,911  10/1973  von der Crone et al. .
3,984,090  10/1976  Swartz .
4,203,762  5/1980  Dansereau .
4,457,494  7/1984  Fisher .
4,846,368  7/1989  Goetz ..................................... 222/3

Primary Examiner—Melvyn J. Andrews
Attorney, Agent, or Firm—Tarolli, Sundheim & Covell

[57] ABSTRACT

A method of recovering an aluminum alloy and a stainless steel alloy from an air bag inflator 10 that has aluminum alloy parts, including an aluminum alloy housing 12 and non-aluminum alloy parts, including a non-aluminum gas filter 18. The non-aluminum parts have a higher melting temperature than the aluminum alloy parts of the air bag inflator 10. The method comprises heating the air bag inflator 10 in the range of the melting temperature of aluminum and then recovering the aluminum alloy which is not contaminated with the material of the higher melting temperature parts. After the aluminum alloy has melted from the air bag inflator 10, the non-aluminum parts are heated to a higher temperature to melt any stainless steel alloy from the non-aluminum parts. The stainless steel alloy is recovered as a high purity stainless steel alloy end product.

12 Claims, 2 Drawing Sheets

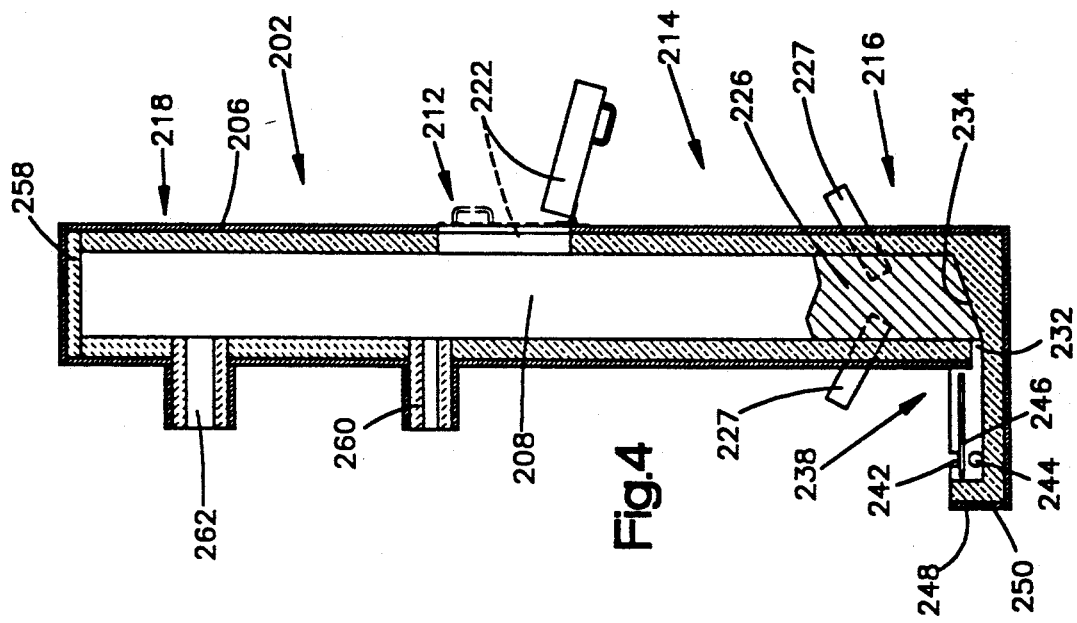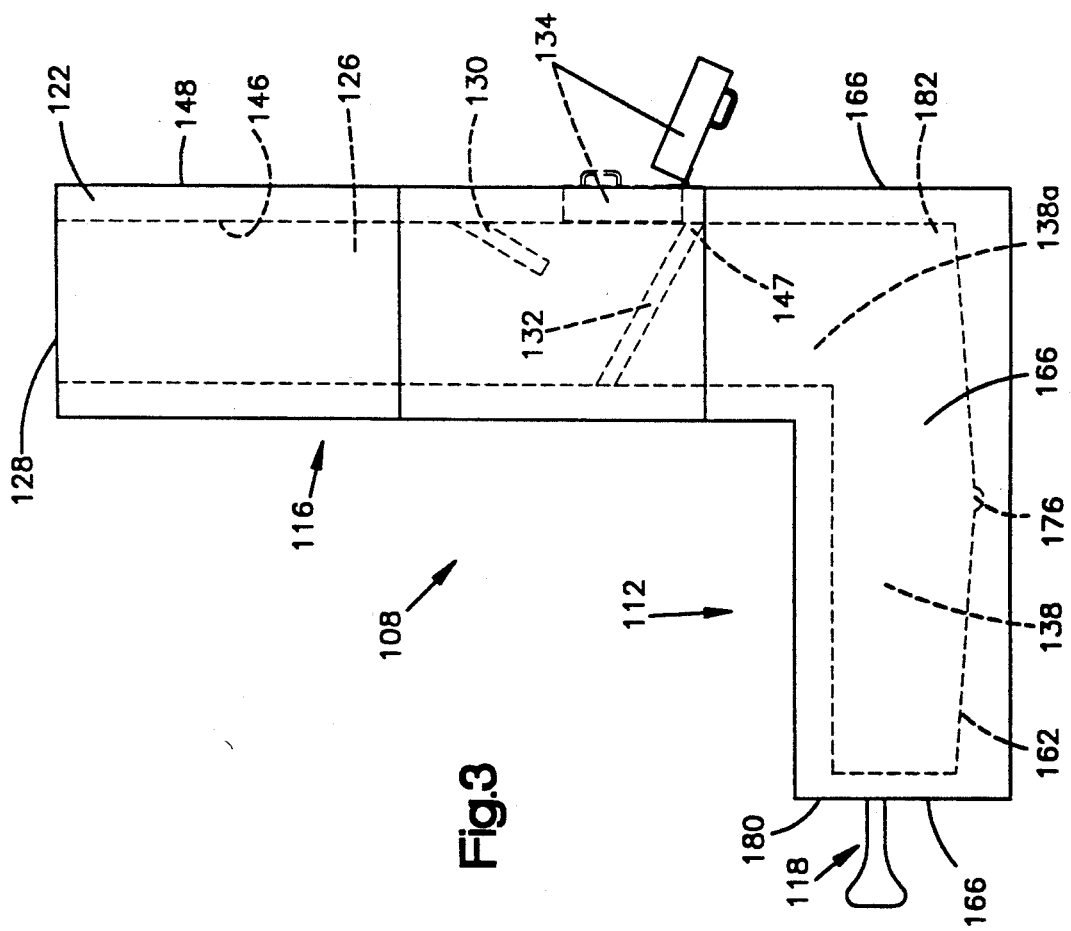

THERMAL RECLAMATION METHOD FOR THE RECOVERY OF METALS FROM AIR BAG INFLATORS

BACKGROUND OF THE INVENTION

1. Field of the Invention

The present invention relates to a method of reclaiming an aluminum alloy and a stainless steel alloy from an air bag inflator.

2. Description of the Prior Art

Air bags are inflated to restrain a vehicle occupant during a vehicle collision. The air bags are inflated by gas. The gas is typically provided by ignition of a gas generating material contained in an air bag inflator. The air bag inflator often has aluminum parts, typically the inflator housing, and stainless steel parts, typically filter screens for filtering the gas as it flows into the air bag.

Attempts have been made to reclaim aluminum alloys used in parts of the air bag inflator. Manual or mechanical stripping has been employed to separate the aluminum alloy parts from the other parts of the air bag inflator. Mechanical stripping is relatively expensive and labor intensive.

Cupola smelting has been used to reclaim metals from an air bag inflator. The complete air bag inflator is heated in a cupola furnace to melt the metal parts. The resulting metal end product is an aluminum alloy metal contaminated with other metals including stainless steel. The contaminated metal end product has little industrial application and nominal economic value.

SUMMARY OF THE INVENTION

The method of the instant invention is advantageous in that a substantially pure aluminum alloy and a substantially pure stainless steel alloy can be reclaimed as useful metal end products from an air bag inflator.

The present invention is a method of recovering an aluminum alloy from an air bag inflator that has aluminum alloy parts, including an aluminum alloy housing, and that also has other non-aluminum parts, including a non-aluminum gas filter in the housing, the other non-aluminum parts having a higher melting temperature than aluminum. The other non-aluminum parts are made of materials, including a stainless steel alloy, having a higher melting temperature than aluminum. The method comprises the steps of: placing the air bag inflator in a furnace; heating the air bag inflator to the melting temperature of aluminum to melt the aluminum alloy parts; removing the non-aluminum parts from the furnace before the higher melting temperature nonaluminum parts reach their melting temperature; and collecting the molten aluminum alloy which is not contaminated with the material of which the higher melting temperature parts are made.

Further, the present invention involves a process for recovering a stainless steel alloy from an air bag inflator that has aluminum alloy parts, including an aluminum alloy housing, and that also has stainless steel parts including parts of a gas filter in the housing. First, the inflator is heated to melt the aluminum alloy parts. The process further comprises the steps of: adding flux to the nonaluminum parts of the air bag inflator from which the aluminum alloy parts have been melted; placing the nonaluminum parts mixed with flux into a furnace; heating the non-aluminum parts and flux to a temperature in the range from about 1450° C. to about 1,650° C. to melt the stainless steel parts; and recovering the molten stainless steel alloy.

BRIEF DESCRIPTION OF THE DRAWINGS

Further features of the present invention will become apparent to those skilled in the art to which the present invention relates from reading the following specification with reference to the accompanying drawings, in which:

FIG. 3 is a schematic illustration of a furnace for use in the recovery of an aluminum alloy from the air bag inflator of FIG. 1 in accordance with the present invention; and FIG. 4 is a schematic illustration of a furnace for the recovery of a stainless steel alloy from the air bag inflator of FIG. 1 in accordance with the present invention.

DESCRIPTION OF A PREFERRED EMBODIMENT OF THE INVENTION

The present invention relates to a method for the recovery of an aluminum alloy and a stainless steel alloy from an air bag inflator. The air bag inflator may be of a variety of constructions. The air bag inflator is preferably activated prior to being processed by the method of the instant invention. However, activation of the air bag inflator prior to the inflator being processed by the method of the instant invention is not a necessity.

Figure 1:
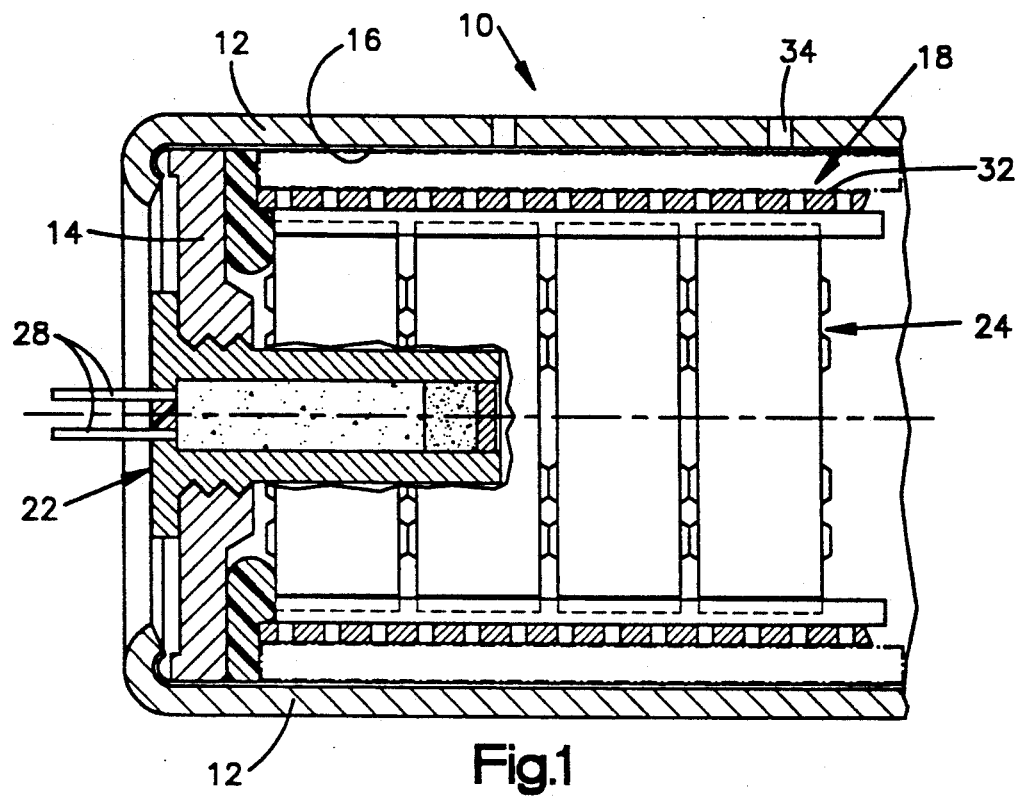
FIG. 1 is a sectional view of a portion of an air bag inflator.

A typical air bag inflator 10, prior to being activated, is illustrated in FIG. 1 and is described in detail in U.S. Pat. No. 4,846,368. The air bag inflator 10 includes a cylindrical housing 12, end caps 14 (only one of which is shown in FIG. 1), a foil 16, a cylindrical gas filter assembly 18, an igniter assembly 22 and gas generating material 24.

Upon the occurrence of sudden vehicle deceleration, such as occurs in a collision, the inflator 10 is activated and produces a large volume of gas to expand an air bag (not shown). A sensor (not shown) transmits a signal over leads 28 to effect actuation of the igniter assembly 22. Hot gases and flames from the igniter assembly 22 cause ignition of the gas generating material 24.

The gas generated by ignition of the gas generating material 24 flows through openings in a rigid cylindrical tube 32 which surrounds the gas generating material 24. The gas then flows through the filter assembly 18. The filter assembly 18 cools the gas and traps particles of hot material to prevent them from entering the air bag. The gas then encounters the layer of foil 16 which the gas ruptures upon building up sufficient pressure. The gas then flows through openings 34 in the housing 12 and into the air bag. After the inflator 10 has been activated, the gas generating material 24 becomes a sintered residue and the ignitor assembly 22 is destroyed.

The air bag inflator 10, prior to activation, weighs about 3.6 lbs. However, it could have a different weight. Parts of the inflator 10 are constructed from an aluminum alloy and weigh about 1.4 lbs. Non-aluminum parts of the inflator 10 weigh about 2.2 lbs. The aluminum alloy parts of the air bag inflator 10 include the housing 12, the end caps 14 and the foil 16. The non-aluminum parts of the air bag inflator assembly 10 include the gas filter assembly 18, the igniter assembly 22, the gas generating material 24, leads 28, and seals.

The gas generating material 24 comprises short, cylindrical grains, some of which encircle the igniter assembly 22. The gas generating material 24 is an alkali metal azide compound and is preferably 61-68% by weight sodium azide, 0 to 5% by weight sodium nitrate, 0 to 5% by weight bentonite, 23 to 28% by weight iron oxide, 2 to 6% by weight graphite fibers and 1 to 2% by weight of fumed silicon dioxide. The grains of gas generating material 24 may have an outer combustion enhancing coating (not shown) which is highly combustible and results in rapid ignition of all outer surfaces of the gas generating material 24.

Figure 2:
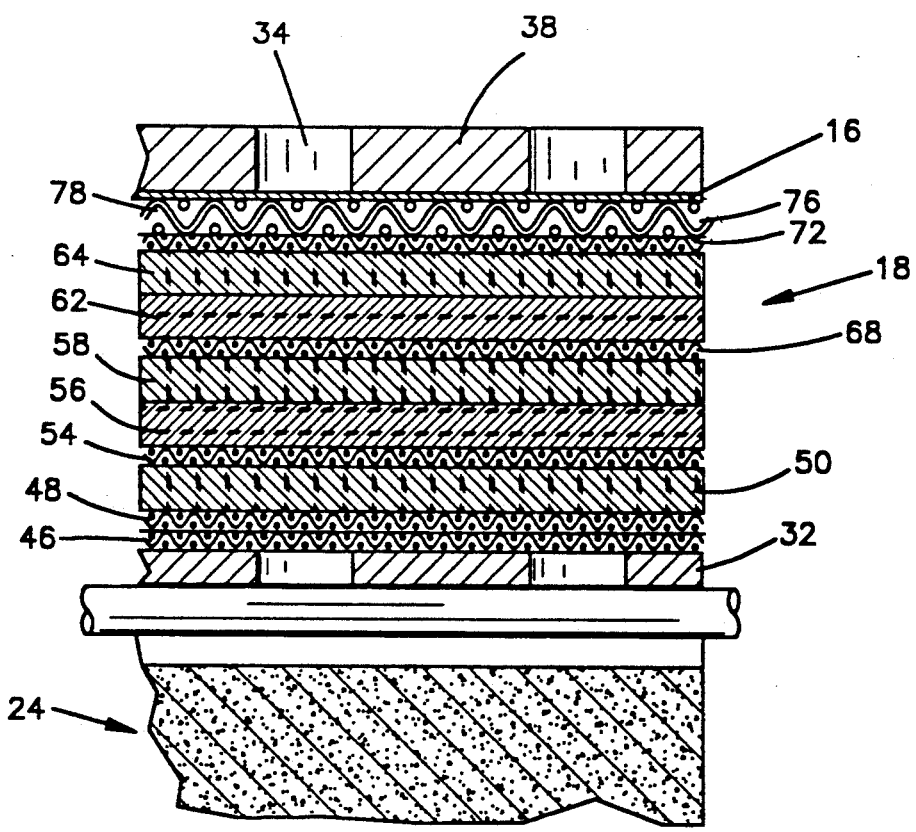
FIG. 2 is an enlarged sectional view of a portion of the air bag inflator of FIG. 1.

The gas filter assembly 18 prevents hot particles from being conducted from the gas generating material 24 into the air bag during inflation of the air bag. The gas filter assembly 18 (as viewed in FIG. 2) is wound around the rigid cylindrical tube 32 and includes two inner layers 46 and 48 of stainless steel mesh screen. A layer of steel wool 50 and a third layer 54 of stainless steel mesh screen are disposed over the two layers 46 and 48 of stainless steel mesh screen. A layer 56 of ceramic material and a second layer 58 of steel wool are next in the filter assembly 18. A layer 68 of stainless steel mesh screen overlies the layer 58 of steel wool. A second layer 62 of ceramic material and another layer 64 of steel wool overlie the layer 68 of stainless steel mesh screen. A layer 72 of stainless steel mesh screen overlies the layer 64 of steel wool. A final layer of stainless steel mesh screen 76 comprises the outer layer of the filter assembly 18. A plenum chamber 78 is formed between the outer filter layer 72 and the layer of foil 16 by the mesh screen 76.

To reclaim the metal from an air bag inflator 10, the inflator 10 is heated in a furnace to the melting temperature of aluminum to recover the aluminum alloy from the inflator 10. The furnace may be of a variety of constructions. As an example, FIG. 3 illustrates a furnace 108. The furnace 108 has a housing 122 which has an L-shaped side elevation and includes a horizontal portion 112 and a vertical portion 116. The housing 122 of the furnace 108 is constructed from a mild steel frame faced with insulating blocks and lined with a silica fire brick.

The vertical portion 116 of the housing 122 includes a vertically extending chamber 126. The chamber 126 extends vertically upward from the horizontal portion 112 of the furnace 108 and has a top opening 128. Located in the chamber 126 is a deflector 130 and a grate 132. An unloading door 134 is disposed in the vertical portion 116 of the housing 122 adjacent to the grate 132. The vertical portion 116 of the housing 122 may include a plurality of segments connected and aligned on top of each other to define the chamber 126.

The top opening 128 permits the loading of air bag inflators 10 into the chamber 126 The top opening 128 also allows heat and other volatiles to escape from the chamber 126 during the operation of the furnace 108.

The deflector 130 is a steel plate anchored to an interior surface 146 of the housing 122. The deflector 130 projects partially across the chamber 126 and downward toward the grate 132 at about a 30° angle relative to the interior surface 146 of the housing 122. There may be a plurality of deflectors 130 anchored at spaced intervals on the interior surface 146 of the housing 122.

The grate 132 extends entirely across the chamber 126 and is anchored to the interior surface 146 of the housing 122. The grate 132 is positioned at approximately a 60° angle relative to the interior surface 146 of the chamber 126 and slopes downward toward the unloading door 134. The grate 132 is made of a heat resistant material, and may be water or air cooled to protect the grate 132 from warping. The grate 132 generally has a lattice configuration so that molten metal may pass through the grate 132.

The unloading door 134 is disposed above the lower portion 147 of the grate 132 and is movable from an open position to a closed position. In the closed position, the inner surface of the unloading door 134 is contiguous with the interior surface 146 of the housing 122. In the open position, the unloading door 134 exposes the chamber 126 to the environment around the furnace 108. The unloading door 134 is made of steel and lined with a refractory material.

The horizontal portion 112 of the housing 122 includes a chamber 138 defined by a floor 162, four side walls 166 and a top wall 180. At one end, the chamber 138 opens at 138a into chamber 126. At the other end of the chamber 126 is a burner 118 to produce heat.

The side walls 166 are planar and have a generally rectangular configuration. The side walls 166 are connected with the top wall 180 and are also connected with the floor 162. A refractory coating seals the floor 162 and the bottom portion 182 of each side wall 166 to make them impervious to molten aluminum alloy metal. The coating comprises a refractory mixture of alumina and silica.

The floor 162 of the horizontal portion 112 of the housing 122 includes a discharge opening 176 and slopes at a slight angle toward the discharge opening 176. The discharge opening 176 includes a movable blocking member (not shown). When the movable blocking member is engaged in the discharge opening 176, fluid flow through the opening is blocked. When the movable blocking member is removed from the discharge opening 176, fluid flow through the opening is possible. The movable blocking member is constructed from a refractory ceramic material.

The heating unit 118 is connected with the side wall 166 that is spaced away from the vertical portion 116 of the housing 122. The heating unit 118 heats the furnace 108 to a predetermined temperature that is distributed evenly throughout the interior chamber 138. The heat moves through the furnace 108 and is vented through the top opening 128 of the chamber 126 of the furnace 108.

The British Thermal Unit (hereinafter "BTU") output of the heating unit 118 is determined by the melting temperature of the aluminum alloy used in the air bag inflators 10. The melting temperature of the aluminum alloy is in the range of about 600° C. to about 700° C.

The heating unit 118 operates on a prescribed mixture of natural gas and compressed air to provide the necessary BTU heating capacity. The heating unit 118 is typically a natural gas burner operated in a neutral to reducing flame condition so that the furnace 108 has an oxygen starved environment in which an aluminum alloy does not burn.

The temperature in the furnace 108 is monitored by suitable devices (not shown) placed in various locations in the interior chamber 138. Such devices and their use are known in the art, and thus it is not necessary to describe them.

The air bag inflators 10 from which aluminum alloy is to be reclaimed are placed in the top opening 128 of the chamber 126 of the furnace 108, fall down the chamber 126, and settle on each other and on the grate 132 The deflector 130 helps channel the air bag inflators 10 through the chamber 126. The air bag inflators 10 are subjected to a temperature in the range from about 700° C. to about 1000° C. to melt the aluminum parts of the inflators 10. The residence time of a load of air bag inflators 10 in the furnace is approximately one and a half hours.

The aluminum alloy melts from the air bag inflators 10 and flows down the chamber 126, passing through the grate 132, to the floor 162 of the housing 122. All of the aluminum parts, including the housing 12, end caps 14 and foil 16, of the inflator 10 thus melt, and the molten aluminum alloy pools in a molten state on the floor 162 of the furnace 108. The non-aluminum parts of the air bag inflators 10 are supported by the grate 132.

The pooled molten aluminum alloy is recovered by opening the discharge opening 176 connected with the floor 162 of the furnace 108. The molten aluminum alloy drains from the floor 162 of the furnace 108 through the discharge opening 176 and is collected as a high purity aluminum alloy end product. Generally, the molten aluminum alloy is formed into ingots and is about the same purity as the original aluminum parts.

The heat from the furnace 108 causes the non-aluminum gas filter assembly 18, the destroyed igniter assembly 22, and the other non-aluminum parts, including the wires, seals, gaskets and the like, of the inflator 10 to collapse (deform due to heat). The residue of the combusted gas generating material 24 is thus enclosed and sealed in a stainless steel alloy case. The stainless steel alloy cases are then raked out of the furnace 108 through the opening provided by the open unloading door 134. The stainless steel alloy cases are then cooled.

To reclaim the stainless steel alloy from the stainless steel alloy cases, the cases removed from the furnace 108 are placed in a furnace 202. The furnace 202 may be of a variety of constructions. As an example, FIG. 3 illustrates a cupola furnace 202.

The furnace 202 includes a housing 206 made of mild steel. The furnace housing 206 is internally insulated by a refractory fire brick lining and defines an internal furnace chamber 208. The internal furnace chamber 208 is subdivided into longitudinal, vertically oriented sections including an inlet section 212, a melt section 214, a cupola well section 216 and an off gas section 218.

Access to the inlet section 212 is provided by a loading door 222 connected with the housing 206 for loading charge materials into the furnace. The charge materials fall through the internal furnace chamber 208 into the melt section 214 of the furnace 202. The melt section 214 includes a coke bed 226 as fuel to heat the furnace 202. Tuyeres 227 are connected at about a sixty degree angle with the furnace 207 and provide air to support combustion of the coke bed 226. The temperature in the melt section 214 of the furnace 202 is in the range of 1450° C. to 1650° C.

The cupola well section 216 is the bottom section of the furnace chamber 208 and includes a discharge outlet 232. A refractory sand bottom portion 234 of the furnace housing 206 is a planar surface tilted slightly toward the discharge outlet 232. The discharge outlet 232 connects the cupola well section 216 to a breast area 238.

The breast area 238 is a trough adjacent to the chamber 208 of the furnace 202. The breast area 238 includes a slag notch 242, a metal dam 250 and a skimmer 246. The slag notch 242 is a groove across the top portion 248 of the breast area 238. A molten metal outlet 244 is located below the slag notch 242. The skimmer 246 extends horizontally between the slag notch 242 and the molten metal outlet 244.

The top of the chamber 208 is closed by a refractory top 258 that also closes the off gas section 218 of the chamber 126. A post combustion burner 260 and an off gas outlet 262 project through a vertical wall portion of the furnace housing 206 which partially defines the off-gas section 218. The post combustion burner 260 burns volatile organics in the off gas. The off gas is discharged through the off gas outlet 262 typically to an air pollution control scrubber (not shown).

The heat in the furnace 202 is produced by combustion of the coke bed 226. The coke is consumed in the process and continually added as charge material to heat the furnace 202 to a predetermined temperature that is distributed within the internal chamber 208 of the furnace 202. Hot gases rise above the melt section 214 of the furnace 202 to preheat the descending charge materials in the inlet section 212.

The cooled stainless steel alloy cases from the furnace 108 are mixed with flux prior to being put into the furnace chamber 208. The flux includes, but is not limited to, limestone, silica rock, gravel, mixtures thereof, and the like. The flux promotes fusion of the slag, prevents the formation of coatings on the coke, and forms a nonhazardous slag. The slag results from the reaction of the flux with the non-metallics in the stainless steel alloy cases and removes impurities from the stainless steel alloy. The slag has a low viscosity with a melting temperature that is compatible with the melting temperature of the stainless steel alloy cases. The low viscosity slag does not coat the surface of the coke, which would impede coke combustion.

The cooled stainless steel alloy cases mixed with flux are placed into the furnace 202 through the loading door 222. A typical composition of the charge materials placed in the furnace 202 includes about 1200 lbs. of stainless steel alloy cases, about 300 lbs. of gravel, about 180 lbs. of limestone, and about 250 lbs. of coke.

The charge materials move down to the melt section 214 of the furnace 202. The temperature within the melt section 214 of the furnace 202 is in the range from about 1450° C. to about 1650° C. The rising hot gases from the coke bed 226 melt the stainless steel alloy to a molten stainless steel alloy and promote the reaction of the flux with the molten stainless steel alloy to form a molten slag. The stainless steel alloy cases have a residence time of approximately one hour in the furnace 202.

The molten stainless steel alloy and molten slag flow down the melt section 214 through the incandescent coke bed 226 to the cupola well section 216 of the furnace 202. From the cupola well section 216, the molten stainless steel alloy and the molten slag flow out into the breast area 238 through the discharge outlet 232. In the breast area 238, the molten stainless steel alloy and molten slag separate due to their different densities. The slag rises to the top of the molten stainless steel alloy and is skimmed off by overflowing the slag notch 242 in the breast area 238. The stainless steel alloy settles to the bottom of the breast area 238, below the skimmer 246, flows over the metal dam 250, is collected and is formed into ingots. The molten stainless steel alloy is of high purity.

The slag is non-hazardous and includes calcium oxide, magnesium oxide, silicon oxide, aluminum oxide, sodium oxide and the like. The non-hazardous slag may be delivered to a landfill or is useful to fill pot holes in roads.

The gases and volatile organics from the heating of the stainless steel alloy cases are vented upward into the off gas section 218 of the furnace 202. Nitrogen gas and other gases are released through the off gas outlet 262 as an off gas from the heat treatment of the stainless steel alloy cases.

The method of the instant invention produces a relatively pure aluminum alloy product, a stainless steel alloy product with low residual amounts of aluminum and an environmentally safe disposal of sodium oxide which is bound in the non-hazardous slag. The net result of the process is the conversion of a non-reusable air bag inflator 10 to valuable metals of an aluminum alloy and a stainless steel alloy for industrial applications.

EXAMPLES

The invention is further illustrated by the following example, although it is understood that the example is intended merely for purposes of illustration and is not intended to limit the scope of the invention.

An air bag inflator constructed as described above was heated to a temperature in the range from about 700° C. to about 1000° C. for about 1 hour in a natural gas furnace such as 108 in accordance with the present invention. A laboratory test was performed on the molten aluminum alloy recovered from the heating of the air bag inflator. The resulting molten aluminum alloy was analyzed by the standard analytical procedure of atomic absorption. Atomic absorption was used to analyze the recovered molten aluminum alloy product for the weight percent of aluminum, copper, magnesium, manganese, silicon, nickel and chromium. The following Table I shows the analysis of the weight percent of the original aluminum alloy in the air bag inflator and the molten aluminum alloy recovered from the natural gas furnace.

Table I shows some differences between the percentages of the ingredients in the recovered aluminum alloy and the percentages of the ingredients in the aluminum alloy in the inflator. These percentage differences are primarily due to the fact that 100% of the aluminum alloy in the inflator is not recovered, thus creating the percentage differences.

TABLE I

| | Aluminum alloy in the inflator Placed in Furnace Weight % | Recovered Aluminum alloy From Furnace Weight % |
|---|---|---|
| Copper | 3.91 | 3.95 |
| Magnesium | 0.60 | 0.51 |
| Silicon | 0.64 | 0.58 |
| Chromium | 0.035 | 0.039 |
| Nickel | <0.01 | <0.01 |
| Manganese | 0.64 | 0.60 |
| Aluminum | Balance | Balance |

The foregoing results demonstrate that the recovered aluminum alloy from the air bag inflator is of generally the same composition and weight percent as the aluminum alloy used in the air bag inflator. Accordingly, the recovered aluminum alloy is not contaminated with the metals from the non-aluminum parts of the air bag inflator.

From the above description of the invention, those skilled in the art will perceive improvements, changes and modifications. Such improvements, changes and modifications within the skill of the art are intended to be covered by the appended claims.

We claim:

1. A method of recovering an aluminum alloy from an air bag inflator having aluminum alloy parts, including an aluminum alloy housing, and having other non-aluminum parts, including a non-aluminum gas filter in the housing, said other non-aluminum parts being made of a material having a higher melting temperature than aluminum, said method comprising the steps of:
   placing the air bag inflator in a furnace;
   heating the air bag inflator to the melting temperature of aluminum to melt the aluminum alloy parts;
   removing the non-aluminum parts from the furnace before the higher melting temperature non-aluminum parts reach their melting temperature; and
   collecting the molten aluminum alloy.

2. The method of claim 1 wherein the step of heating the air bag inflator to the melting temperature of aluminum to melt the aluminum alloy parts comprises heating the air bag inflator to a temperature in the range of about 700° C. to about 1,000° C.

3. The method of claim 1 wherein the air bag inflator placed in the furnace comprises (a) aluminum alloy parts including a housing, an end cap for the housing and a layer of foil and (b) non-aluminum parts including a non-aluminum gas filter, and wherein said step of heating to melt the aluminum alloy parts includes melting the housing, end cap and layer of foil.

4. The method of claim 1 further comprising the step of recovering the collected molten aluminum alloy as ingots which are about the same purity as the original aluminum parts.

5. The method of claim 1 wherein the step of heating to melt the aluminum alloy parts includes placing the air bag inflator in a natural gas furnace.

6. The method of claim 1 wherein the non-aluminum parts of the air bag inflator include stainless steel alloy parts and wherein the step of heating the air bag inflator to the melting temperature of aluminum comprises heating the air bag inflator to a temperature in the range of about 700° C. to about 1000° C. so that the aluminum alloy melts from the inflator and the stainless steel parts of the inflator collapse and form a stainless steel alloy case.

7. The method of claim 6 wherein the stainless steel parts of the air bag inflator comprise stainless steel screen and stainless steel wool and the stainless steel alloy case comprises the stainless steel screen and the stainless steel wool and further including the step of enclosing a residue of a combustible gas generating material that includes sodium azide and a metal oxide in the stainless steel alloy case.

8. The method of claim 7 further comprising the step of recovering the stainless steel alloy from the stainless steel alloy case by:
   adding a flux to the stainless steel alloy case;
   placing the stainless steel alloy case mixed with the added flux into another furnace;
   heating the stainless steel alloy case and the added flux to a temperature in the range from about 1450° C. to about 1650° C. in the other furnace to melt the stainless steel alloy case and form a molten slag;
   separating the molten stainless steel alloy from the molten slag; and
   recovering the molten stainless steel alloy.

9. The method of claim 8 wherein the step of adding a flux to the stainless steel alloy case comprises adding a flux selected from the group consisting of limestone, silica, rock, gravel and combinations thereof.

10. The method of claim 8 further comprising the step of recovering the molten slag which is non-hazardous and which comprises calcium oxide, magnesium oxide, silicon oxide, aluminum oxide, sodium oxide and combinations thereof.

11. The method of claim 8 wherein the step of placing the stainless steel alloy case into another furnace includes placing the stainless steel alloy case in a cupola furnace.

12. A method of recovering aluminum alloy and stainless steel alloy metals from an air bag inflator having aluminum alloy parts, including an aluminum alloy housing, and having other non-aluminum alloy parts, including a non-aluminum gas filter in the housing, said non-aluminum parts being made of materials, including a stainless steel alloy, having a higher melting temperature than aluminum, said method comprising the steps of:

heating the air bag inflator to a temperature in the range of about 700° C. to about 1000° C. to melt the aluminum alloy parts and collapse the non-aluminum parts of the inflator to form a stainless steel alloy case;

separating the molten aluminum alloy from the stainless steel alloy case;

collecting the molten aluminum alloy;

adding a flux to the separated stainless steel alloy case, said flux being selected from the group consisting of limestone, silica, rock, gravel and combinations thereof;

heating the stainless steel alloy case and the added flux to a temperature in the range from about 1,450° C. to about 1,650° C. to melt the stainless steel alloy and form a molten slag;

separating the molten stainless steel alloy from the molten slag; and recovering the molten stainless steel alloy.

* * * * *